United States Patent [19]

Jones

[11] 4,209,202

[45] Jun. 24, 1980

[54] AUTOMATICALLY ADJUSTABLE SWITCHING CIRCUIT FOR A SKID CONTROL SYSTEM

[75] Inventor: James J. Jones, Plano, Tex.

[73] Assignee: Texas Instruments Incorporated, Dallas, Tex.

[21] Appl. No.: 229,334

[22] Filed: Feb. 25, 1972

Related U.S. Application Data

[63] Continuation of Ser. No. 837,497, Jun. 30, 1969, abandoned.

[51] Int. Cl.² ............................................. B60T 8/12
[52] U.S. Cl. .............................. 303/106; 188/181 A; 303/105
[58] Field of Search .................... 303/21, 20, 105, 106, 303/93; 188/181; 340/52 R, 53

[56] References Cited

U.S. PATENT DOCUMENTS 3,578,819   5/1971   Atkins ............................. 303/21 BE Primary Examiner—Trygve M. Blix
Assistant Examiner—Reinhard J. Eisenzopf
Attorney, Agent, or Firm—William E. Hiller; Melvin Sharp; James T. Comfort

[57] ABSTRACT

A vehicle skid control braking system including a circuit for generating a signal having a magnitude varying in accordance with braking conditions such as vehicle speed, wheel speed and road surface conditions, a circuit for generating a retarding force signal proportional to such braking control factors and a circuit for generating a ramp signal varying in accordance with vehicle speed, and a speed switch responsive to vehicle wheel speed signals, retarding force signals and velocity ramp signals for producing a speed dependent control signal for controlling the vehicle braking system.

10 Claims, 5 Drawing Figures

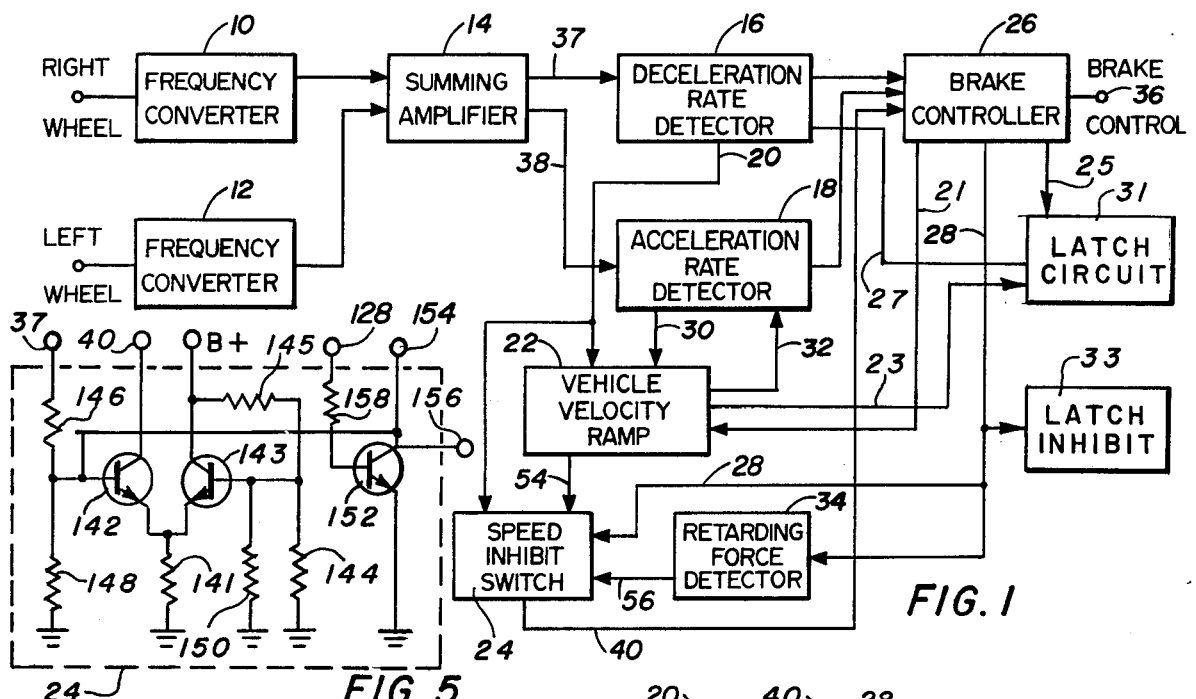

AUTOMATICALLY ADJUSTABLE SWITCHING CIRCUIT FOR A SKID CONTROL SYSTEM

This is a Continuation of Application Ser. No. 837,497, filed June 30, 1969 now abandoned.

This invention relates to an automatically adjustable switching circuit, and, more particularly, to an automatically adjustable switching circuit in the control module of a skid control braking system.

When braking an automobile under emergency stopping conditions or under adverse road conditions, the possibility exists that the vehicle will go into an uncontrollable skid or a controllable skid which prevents the driver from bringing his vehicle to a safe stop within the distance available. In either case, one factor that indicates an imminent skid is the deceleration rate of the rear wheels. Some improvement in vehicle stability can be achieved by automatically "pumping" or pulsing the brakes at the rear wheels in an arbitrary pre-programmed way.

Recently, a system has been developed which operates on the principle of inhibiting the normal braking action initiated by the automobile operator. In this system, wheel speed sensors generate signals proportional to wheel speed. The wheel speed signals are processed through a control module which generates a voltage to energize a solenoid in an actuator that controls the hydraulic braking system to the rear wheels. When a skid is imminent, a command signal from the control module causes the actuator solenoid to close a vacuum passage in a diaphragm chamber. By action of the diaphragm and the normal hydraulic pressure from the master cylinder as developed by the automobile operator, the hydraulic pressure to the rear wheels is released, thereby inhibiting the rear wheel braking action. When the rear wheels speed up, the control module produces a signal to de-energize the actuator solenoid. This restores line pressure and reapplies the rear brakes. In effect, the system "pumps" the rear brakes in a manner often recommended for controlled stopping in adverse driving conditions.

The control module includes a frequency convertor for each wheel speed sensor to convert a frequency varying signal into a direct current signal. A summation in a summing amplifier of the frequency convertor outputs produces a composite of the wheel speed signals. A deceleration rate detector and an acceleration rate detector respond to the output of the summing amplifier to produce outputs proportional to the rate of deceleration and the rate of acceleration, respectively, of the rear wheels of a motor vehicle. A signal proportional to the output of the summing amplifier is transferred to a vehicle velocity ramp generator and one input of an automatically adjustable switching circuit. The velocity ramp generator produces a step ramp function having an overall slope related to the actual speed of the automobile when braking to a stop. In addition to a signal related to wheel speed, the switching circuit also has an input from the vehicle velocity ramp generator and an input from a retarding force detector. An output is produced at the switching circuit whenever the summation of a wheel speed signal, a velocity ramp signal, and a retarding force signal reaches a threshold condition. The retarding force detector produces an output signal which relates to the braking factors including tire condition, brake condition, and the condition of the road surface. To generate a control signal to the actuator solenoid, the output of the deceleration rate detector, the acceleration rate detector, and the switching circuit must have a certain designated relationship. These three signals are the inputs to a brake controller as the last component in the control module.

An object of the present invention is to provide an automatically adjustable switching circuit. Another object of this invention is to provide an automatically adjustable switching circuit in a skid control vehicle braking system. A still further object of this invention is to provide apparatus for releasing the output of an acceleration rate detector in a skid control vehicle braking system.

In accordance with the present invention, the output of an acceleration rate detector is released by the operation of an automatically adjustable switching circuit. A signal proportional to vehicle wheel speed, a signal varying in accordance with braking control factors, such as road surface characteristics, and a ramp current inversely related to vehicle speed are connected to inputs of a switching circuit. When the sum of these three signals reaches a threshold condition, the switching circuit operates to release the output of the acceleration rate detector that is then applied as one input to a brake controller. Since both the braking control factor signal and the ramp current are variable signals, each time the switching circuit operates, it releases the acceleration rate detector at a different wheel speed in the operation of a skid control system.

A more complete understanding of the invention and its advantages will be apparent from the specifications and claims and from the accompanying drawings illustrative of the invention.

Referring to the drawings:

FIG. 1 is a block diagram of a control module for a skid control vehicle braking system;

FIG. 2 is a block diagram of the automatically adjustable switching circuit of the control module of FIG. 1;

FIG. 3 illustrates the waveforms generated in the operation of an automatically adjustable switching circuit in accordance with the present invention;

FIG. 4 is an electrical schematic of the switching circuit of FIG. 2; and

FIG. 5 is an electrical schematic of an alternate embodiment of the adjustable switching circuit.

Referring to the drawings, in FIG. 1 there is illustrated the components of a control module in a skid control vehicle braking system including frequency convertors 10 and 12. The frequency convertor 10 connects to a wheel sensor (not shown) at the right rear wheel of a motor vehicle. The wheel sensor generates a signal having frequency variations proportional to wheel speed. The faster the wheel speed, the higher the frequency of the signal connected to the frequency convertor 10. Similarly, the frequency convertor 12 responds to a frequency dependent signal from a wheel sensor (not shown) at the left rear wheel of a motor vehicle. The output of the converters 10 and 12 is a D.C. voltage having a magnitude related to the right rear wheel speed and the left rear wheel speed, respectively.

These two speed dependent voltages are connected to inputs of a summing amplifier 14 which has two output signals both proportional to the sum of the output voltages of the frequency convertors 10 and 12. One of the output signals from the summing amplifier 14 connects via line 37 to a deceleration rate detector 16 and the second output connects via line 38 to an acceleration rate detector 18. Both the deceleration rate detector 16 and the acceleration rate detector 18 include a driver input section. The output of the driver section of the deceleration rate detector 16 appears on a line 20 and connects to inputs of a vehicle velocity ramp generator 22 and an automatically adjustable switch 24. Another input to the vehicle velocity ramp generator 22 is a signal related to the output of a brake controller 26 on a line 21. A clamping circuit in the acceleration rate detector 18 also connects to the ramp generator 22 through line 30.

Additional inputs to the automatically adjustable switch 24, other than the voltage proportional to wheel speed on line 20, include a ramp current from the vehicle velocity ramp generator 22 via line 54, the signal on the line 28 from the brake controller 26, and a retarding force current from a retarding force detector 34 via line 56. An output terminal of the adjustable switch 24 connects via line 40 to one input of the brake controller 26. An output signal from the acceleration rate detector 18 is partially controlled by the adjustable switch 24. A second input to the controller 26 is the output of the deceleration rate detector 16.

In operation of the control module of FIG. 1, the frequency varying signals generated at the right rear wheel sensor and the left rear wheel sensor are converted in frequency convertors 10 and 12, respectively, into D.C. voltages that are combined in a summing amplifier 14 to produce inputs to a deceleration rate detector 16 and an acceleration rate detector 18. The deceleration rate detector 16 generates a signal as one input to the brake controller 26 whenever the deceleration rate of the rear wheels exceeds a set limit. The acceleration rate detector 18 generates a signal as one input to the brake controller 26 whenever the speed inhibit switch 24 does not inhibit the normal operation of the acceleration detector. To produce a brake inhibit control signal on an output terminal 36, connected to a solenoid (not shown) on a brake actuator, both the detectors 16 and 18 must generate a control signal at the inputs to the brake controller 26. The automatically adjustable switch 24 will release the output of the acceleration rate detector 18 whenever the three input signals thereto satisfy preset conditions, and the switch itself is not inhibited from operating.

In a typical skid control operation, the automobile operator applies pressure to the brake pedal which actuates the hydraulic brake system in the usual manner. When the deceleration rate detector 16 senses that the decrease in rear wheel speed indicates that a skid is imminent, it produces a control signal as one input to the brake controller 26. At the same time, the acceleration rate detector 18 permits the brake controller 26 to be triggered into a brake inhibit mode if the adjustable switch 24 has released the output of the detector 18. Whenever a control pulse from the deceleration rate detector 16 is present and the adjustable switch 24 releases the output of the acceleration rate detector 18, an output pulse is generated at the terminal 36 to energize a solenoid at a brake actuator. Energizing this solenoid, as explained previously, interrupts the normal hydraulic pressure applied to the rear wheels thereby inhibiting braking action.

Before the automatically adjustable switch 24 will release the output of the acceleration rate detector 18, the sum of an input current related to the rear wheel speed, an input current from the vehicle velocity ramp generator 22, and an input current from the retarding force detector 34 must reach a threshold level.

During the time interval of the brake inhibit signal at the terminal 36, hydraulic pressure is released from the rear wheels which will then begin to spin up to the speed of the vehicle. This spin up of the rear wheels is sensed by the deceleration rate detector 16 and the acceleration rate detector 18 to cause the brake controller 26 to produce an output signal that deenergizes the actuator solenoid, thereby reapplying pressure to the rear wheel brake cylinders. Also provided is a latch circuit 31 which controls the "on time" of the deceleration rate detector 16 by varying its characteristics with respect to vehicle speed and the rate of acceleration of the vehicle wheels. A latch inhibit circuit 33 prevents the latch circuit 31 from controlling the deceleration rate detector until the actuator solenoid is energized. A signal generated by the brake controller 26 and coupled to the latch inhibit circuit 33 via line 28 operates the latch inhibit circuit 33, which in turn releases the latch circuit 31 and allows it to control the "on time" of the deceleration rate detector 16. Latch circuit 31 receives input signals from the vehicle velocity ramp circuit 22 via line 23 and from the brake controller 26 via line 25 and is coupled to control the deceleration rate detector 16 via line 27. On low-mu surfaces at low vehicle speeds, the latch circuit extends the brake inhibit time or "on time" of the deceleration rate detector. Applying hydraulic pressure to the rear wheel cylinders will slow the speed of the rear wheels which will again produce conditions to actuate the brake controller 26, thereby initiating a second inhibit cycle. This operation continues with the rear wheel speed decreasing and increasing until the vehicle has been brought to a controlled stop. In effect, the control module "pumps" the rear brakes in a manner ofter recommended for controlled vehicle stopping.

Referring to FIG. 2, there is shown a block diagram of that part of the control module for supplying input control signals to the brake controller 26. A signal varying with rear wheel speed, such as illustrated at FIG. 3a, is applied to the input terminal 37. A similar signal also connects to the terminal 38. As explained previously, the first stage of the deceleration rate detector 16 provides power amplificiation of the signal at the terminal 37. This amplified signal has a waveform similar to that illustrated at FIG. 3a and is connected as one input to the adjustable switch 24.

During normal operation, the ouput of the deceleration rate detector 16 is at a ZERO level, using the standard practice of a ONE and ZERO as the two output levels of the detectors 16 and 18. Also during normal operation, the output of the acceleration rate detector 18 is at a ONE level. However, the output at line 40 is clamped at the ZERO level by operation of the adjustable switch 24. During a braking operation, if the rate of deceleration of the rear wheels exceeds a predetermined limit, the output of the detector 16 switches to a ONE level to provide one input to the brake controller 26. When the speed of the rear wheels drops below the variable set point established in the adjustable switch 24, the clamp on the output of the acceleration rate detector 18 is removed and the ONE level of the acceleration rate detector 18 supplies the second input to the brake controller 26. When two signals at the ONE level are connected to the brake controller 26, a brake inhibit signal is generated at the terminal 36 to energize the brake actuator solenoid as explained previously.

Assume that the brakes are applied at the point 41 of the curve illustrated in FIG. 3a. The wheel speed decreases along the curve until the first inhibit pulse, illustrated at FIG. 3e, appears at the terminal 36. Hydraulic pressure is released from the rear wheel cylinders and the speed of the rear wheels levels off and begins to speed up to the actual speed of the vehicle. Assuming a relatively high frictional road surface, as the rear wheel speed increases, the rate of wheel acceleration passes a limit established in the detector 18 and the output of the acceleration rate detector changes from a ONE level to a ZERO level. Since only one of the two inputs to the brake controller 26 is now at the ONE level, the output of the controller drops to a ZERO level thereby de-energizing the actuator solenoid. Brake pressure will again be applied to the rear wheels and the rear wheel speed decreases along the second negative going slope of the curve illustrated at FIG. 3a. Note that the first voltage peak displaced from the point 41 is lower than the original starting voltage indicating an overall slowdown of wheel speed. Through internal timing circuitry, as the rear wheel speed increases along the first positive slope of FIG. 3a, the output of the deceleration rate detector 16 returns to the ZERO level.

As brake pressure is reapplied to the rear wheels, they again slow down and the above operation is repeated. Each time, however, the maximum wheel speed is lower than that represented by the point 41. For each brake inhibit cycle, the speed at which the switch 24 unclamps the output of the acceleration rate detector 18 is lowered by the outputs of the vehicle velocity ramp generator 22 and the retarding force detector 34. In effect, the automatically adjustable switch 24 operates from a variable set point.

Referring to FIG. 4, there is shown a schematic of the adjustable switch 24 for unclamping a junction 40 at different values of rear wheel speed for each inhibit cycle. The junction 40 controls the release of the output of the acceleration rate detector 18 to the brake controller 26. A transistor 42 connects to a drive circuit including a sensitor 44 (a resistance variable with temperature) in series with resistors 46 and 48. The junction of the resistors 46 and 48 ties to a resistor 50 and the collector electrode of an inhibit transistor 52. Also connected to both the collector electrode of transistor 52 and the base electrode of the transistor 42 is an input terminal 54 for receiving the output of the vehicle velocity ramp generator 22. A current signal from the retarding force detector 34 is also connected to the base electrode of the transistor 42 at an input terminal 56.

Both the transistors 42 and 52 are in a common emitter configuration with the collector electrode of the former connected to the junction 40 and the base electrode of the latter to the voltage pulses on the line 28, referring to FIG. 1, through a base resistor 58.

In operation, a current signal having a waveform as illustrated in FIG. 3b is applied to the terminal 56 and a current signal having a waveform as illustrated in FIG. 3c is applied to the terminal 54. These two currents are summed at the junction 60 to produce a base drive that saturates the transistor 42, thereby clamping the junction 40 to ground. As the rear wheel speed decreases, the voltage applied to the circuit including the sensitor 44 and the resistors 46 and 48 produces a current at the junction 60 to turn off the transistor 42. This unclamps the junction 40 and an inhibit signal is produced at the output of the brake controller 26.

When an output voltage pulse appears at the terminal 36, the transistor 52 saturates to clamp the junction 60 at ground potential. Now, as the wheel speed increases the transistor 42 remains turned off. When the brake controller output again returns to the ZERO level, the transistor 52 turns off and the transistor 42 is driven into saturation by the signals at the terminals 54 and 56.

Note, that both the current waveforms at FIGS. 3b and 3c increase so that at the next decrease in wheel speed the switching speed of the transistor 42 will have shifted. During the next application of brake pressure to the rear wheels, a lower rear wheel speed will have to be attained before the transistor 42 turns off. When the transistor 42 is again switched off, the junction 40 will be released and another control signal connected to the brake controller 26. This train of control pulses is illustrated at FIG. 3d.

Referring to FIG. 5, there is shown a schematic of an alternate embodiment of the adjustable switch 24 that includes an additional transistor for temperature compensation purposes without utilizing a sensitor. A differential comparator having common emitter transistors 142 and 143 connects to a drive circuit including series resistors 146 and 148. The junction of resistors 146 and 148 ties to the collector electrode of an inhibit transistor 152. Also connected to both the collector electrode of transistor 152 and base electrode of transistor 142 is an input terminal 154 for receiving the output of the vehicle velocity ramp generator 22 and an input terminal 156 for receiving current signals from the retarding force detector 34. The emitter electrodes of transistors 142 and 143 are coupled to ground through emitter resistor 141, while the collector electrode of transistor 142 is connected to the junction 40 and the collector electrode of transistor 143 is connected to B+. A base resistor 144 and trim resistor 150 are each connected between ground and the base electrode of transistor 143 which in turn is connected to B+ through a resistor 145. Inhibit transistor 152 has its emitter electrode grounded and its base electrode connected through base resistor 158 to receive voltage pulses from the brake controller 26 via line 128.

The operation of this embodiment of the adjustable switch is substantially the same as the circuit operation above described with respect to the adjustable switch of FIG. 4.

Although a preferred embodiment of the invention has been described in detail, it is to be understood that various changes, substitutions, and alterations can be made therein without departing from the spirit and scope of the invention as defined by the appended claims.

What is claimed is:

1. In a skid control vehicle braking system including wheel speed signal generating means for generating a signal having a magnitude varying in accordance with the vehicle wheel speed comprising:
 (a) a deceleration rate detector connected at an input to said wheel speed signal generating means for generating a deceleration rate signal;
 (b) a speed switch connected at an input to said wheel speed signal generating means for producing a speed dependent control signal for inhibiting normal vehicle braking action;
 (c) brake control means connected at a first input to said deceleration rate detector and at a second input to said speed switch, said brake control means having a first output level when both inputs are at the same signal level, and a second output level when either of said inputs is at a different signal level;

(d) an acceleration rate detector connected at an input to said wheel speed signal generating means for producing an acceleration rate signal, and connected at an output to said brake control means, wherein (e) said acceleration rate detector and said speed switch in combination produce one input to the brake control means; and wherein (f) said brake control means produces a first output level when the inputs connected thereto are at the same signal level, and produces a second output level when either of said inputs is at a different signal level.

2. In a skid control vehicle braking system including wheel speed signal generating means for generating a signal having a magnitude varying in accordance with the vehicle wheel speed comprising:

(a) a deceleration rate detector connected at an input to said wheel speed signal generating means for generating a deceleration rate signal;

(b) an acceleration rate detector connected at an input to said wheel speed signal generating means for producing an acceleration rate signal;

(c) a speed switch connected at an input to said wheel speed signal generating means for producing a speed dependent control signal; and (d) brake control means connected at a first input to said deceleration rate detector, at a second input to said accelerator rate detector and at a third input to said speed switch, said brake control means having a first output level when said inputs are at preselected signal levels and a second output level when any one of said inputs is at a signal level respectively different from said preselected signal levels.

3. A speed switch in a skid control vehicle braking system including means for generating a signal having a magnitude varying in accordance with vehicle speed, means for generating a signal having a magnitude varying in accordance with vehicle wheel speed, and brake control means having a first output level for inhibiting normal braking action and a second output level for permitting normal braking action comprising:

(a) a first transistor having a collector electrode connected to an input of said brake control means;

(b) a second transistor having a base electrode connected to the output of the brake control means and a collector electrode connected to the base electrode of said first transistor; and (c) circuit means for connecting said vehicle speed and vehicle wheel speed signals to the base electrode of said first transistor.

4. In a skid control system for selectively inhibiting the normal braking action of a wheeled vehicle, the invention comprising:

(a) wheel speed means for generating a signal representative of vehicle wheel speed;

(b) deceleration rate detecting means responsive to said wheel speed signal for generating a deceleration signal when the rate of deceleration of the vehicle wheels reaches a selected rate of deceleration;

(c) control means responsive to said deceleration signal for generating a brake inhibiting signal for inhibiting the normal braking action of the wheeled vehicle; and (d) switch means responsive to said wheel speed signal for generating a prevent signal when said wheel speed signal is above a selected magnitude, said prevent signal being at least a function of wheel speed and independent of wheel speed rate of deceleration; wherein (e) said control means is prevented from generating said brake inhibiting signal in response to said prevent signal when the wheel spaced signal is above said selected magnitude; and wherein (f) said control means generates said brake inhibiting signal when the wheel speed signal reaches said selected magnitude and the rate of deceleration of the vehicle wheel speed reaches said selected rate of deceleration.

5. The skid control system of claim 4 and further including:

(a) acceleration rate detecting means responsive to said wheel speed signal for generating an acceleration signal when the rate of acceleration of the vehicle wheels reaches a selected rate of acceleration; wherein (b) said control means is prevented from generating said brake inhibiting signal in response to said acceleration signal when said wheel speed signal reaches said selected rate of acceleration.

6. The skid control system of claim 4 and further including switch inhibit means for inhibiting said switch means as a function of said brake inhibiting signal.

7. The skid control system of claim 6 wherein said function of said brake inhibiting signal is the period during which said control means generates said brake inhibiting signal.

8. In a skid control system for selectively inhibiting the normal braking action of a wheeled vehicle, the invention comprising:

(a) wheel speed means for generating a signal representative of vehicle wheel speed;

(b) deceleration rate detecting means responsive to said wheel speed signal for generating a deceleration signal when the rate of deceleration of the vehicle wheels reaches a selected rate of deceleration;

(c) control means responsive to said deceleration signal for generating a brake inhibiting signal for inhibiting the normal braking action of the wheeled vehicle;

(d) switch means responsive to said wheel speed signal for generating a prevent signal when said wheel speed signal is above a selected magnitude, said prevent signal being a function of wheel speed independent of wheel speed rate of deceleration for controlling said control means so as to prevent the generation of said brake inhibiting signal thereby when the vehicle wheel speed signal is above said selected magnitude; and (e) latch means responsive to said control means for generating a latch signal, said latch signal controlling said deceleration rate detecting means for insuring that the deceleration signal generated thereby is maintained during a preselected period; wherein (f) said control means is prevented from generating said brake inhibiting signal by said prevent signal when the vehicle wheel speed signal is above said selected magnitude and by said deceleration signal when the vehicle wheel speed rate of deceleration is different from said selective rate of deceleration; and wherein (g) said control means generates said brake inhibiting signal when the vehicle wheel speed signal reaches said selected magnitude and the rate of deceleration of the vehicle wheel speed reaches said selected rate of deceleration.

9. The skid control system of claim 8 wherein said preselected period commences when the rate of deceleration of the vehicle wheel speed reaches said selected rate of deceleration and the vehicle wheel speed signal reaches said selected magnitude.

10. The skid control system of claim 8 and further including latch inhibit means responsive to said brake inhibiting signal for generating a latch inhibit signal, said latch inhibit signal being coupled to said latch means for selectively preventing said latch means from controlling said deceleration rate detecting means until said control means generates a brake inhibiting signal sufficient to inhibit the normal braking action of the wheeled vehicle.

* * * * *